United States Patent [19]

Sun et al.

[11] 4,158,449

[45] Jun. 19, 1979

[54] INLET AIR CLEANER ASSEMBLY FOR TURBINE ENGINES

[75] Inventors: Cedric Sun, Great Neck; Charles J. Roach, Brooklyn, both of N.Y.

[73] Assignee: Pall Corporation, Glen Cove, N.Y.

[21] Appl. No.: 748,598

[22] Filed: Dec. 7, 1976

[51] Int. Cl.$^2$ .................. B64D 1/18; B01D 50/00; B05B 17/02
[52] U.S. Cl. .................. 244/136; 55/306; 55/329; 55/337; 55/431; 55/488; 55/489; 55/521; 55/526; 60/39.09 P; 244/53 B; 239/171; 137/15.1
[58] Field of Search .............. 55/306, 332, 333, 337, 55/347, 431, 488, 489, 521, 526, DIG. 25, 329; 244/53 B, 136; 137/15.1; 60/39.09 P, 311; 239/171

[56] References Cited

U.S. PATENT DOCUMENTS

| 2,367,227 | 1/1945 | Lowther | 55/332 |
|---|---|---|---|
| 2,619,188 | 11/1952 | Haw et al. | 55/489 |
| 2,894,050 | 7/1959 | Stiles | 55/DIG. 25 |
| 3,165,390 | 1/1965 | Parren et al. | 55/431 |
| 3,309,867 | 3/1967 | Ehrich | 60/39.09 P |
| 3,385,034 | 5/1968 | Farr | 55/337 |
| 3,690,606 | 9/1972 | Dall | 55/526 |
| 3,915,679 | 10/1975 | Roach et al. | 55/347 |
| 3,979,903 | 9/1976 | Warren et al. | 60/39.09 P |

FOREIGN PATENT DOCUMENTS

| 2362013 | 6/1974 | Fed. Rep. of Germany | 60/39.09 P |
|---|---|---|---|
| 1320200 | 1/1963 | France | 55/337 |
| 1285574 | 8/1972 | United Kingdom | 55/488 |

*Primary Examiner*—Frank W. Lutter
*Assistant Examiner*—David L. Lacey

[57] ABSTRACT

An inlet air cleaner assembly is provided for the air intake of gas turbine engines comprising, in combination, an array of vortex air cleaners removing coarse and heavy contaminant particles, but not light and well dispersed contaminant particles, and an array of sheets of filamentary woven or nonwoven material, arranged to receive partially cleaned air from the vortex air cleaner array, and remove light and well dispersed contaminant particles suspended therein.

25 Claims, 5 Drawing Figures

INLET AIR CLEANER ASSEMBLY FOR TURBINE ENGINES

Agricultural aircraft are now widely used throughout the world for the application of chemicals of all kinds over large or not readily accessible land areas. In this field, agricultural aircraft have virtually displaced other less efficient application methods, such as tractor drawn equipment and trucks. Both dry and wet chemical applications are made, and a special type of fixed wing aircraft having especially adapted flight characteristics has been developed for the purpose. Rotary wing aircraft also are used, although they are more expensive to operate. However, aircraft powered by gas turbine engines have been troubled by a relatively short engine life.

Gas turbine engines ingest large quantities of air, approximately eight times the volume of air of an equivalent piston engine. The nature of the work requires that the aircraft fly low and double on its tracks most of the time, so that the aircraft spends considerable time flying through the cloud of chemicals it is applying. Wind and aircraft-generated currents envelop the aircraft in its own cloud of chemicals and, under dry conditions, large quantities of dust can at the same time be raised from the ground below, particularly during landing, loading and take-off. The result is that the turbine engine consumes large quantities of dirt and chemicals, which can be in solid or liquid form, but in either form greatly increase engine wear and controls malfunction due to contamination. Compressed air from the engine is sometimes used to drive auxiliary equipment and to condition the cockpit environment. Both are adversely affected by contaminated air.

The problem is complicated by the fact that not only must the dirt and chemicals be efficiently removed from the air entering the engine intake, but they must be removed with the least amount of power loss to the engine. Inlet restrictions to a gas turbine engine cause power loss, and if engine power is reduced sufficiently due to the operation of an air cleaner, the load may have to be lightened. This can mean that more frequent returns for reloading are required.

Conventional filters are not satisfactory for cleaning the air at the engine air inlet, because they introduce too high an inlet restriction, so that a reasonable volume of filter is not capable of passing a sufficient volume of air per unit time at equivalent power loss. The inlet restriction increases as the filter becomes dirt-loaded, and increases markedly if the filter becomes wet.

Vortex air cleaners in arrays have been employed, as described in U.S. Pat. No. 3,520,114, patented July 14, 1970, U.S. Pat. No. 3,590,560, patented July 6, 1971 and U.S. Pat. No. 3,611,679, patented Oct. 12, 1971. Such cleaners are very effective for military and civilian use, under heavy dirt conditions, such as in take off and landing on dirt strips, and in dust storms. However, vortex air cleaners have not been proposed for use in agricultural aircraft, and would not be fully satisfactory if used on agricultural aircraft, because they do not remove with high efficiency aerosols or mists of well-dispersed liquid and solid materials, such as frequently result from sprays of herbicides and insecticides. They are not capable of separating very finely-divided light particles, since they operate by centrifugal force, and the air velocity through the vortex air cleaners is not very high. Lighter particles tend to move to the center, rather than moving to the periphery of the flow, and are carried out the clean air outlet directly into the engine. Thus, vortex air cleaners considerably reduce wear, but they do not completely eliminate it.

In chemical plants, where stack and tower gases can include aerosol mists, mist eliminators have been utilized to capture the mist particles and avoid environment pollution. Such eliminators are made of mesh material, usually of knitted wire mesh, although other mesh materials can be used. The airborne liquid droplets coalesce on the wire surfaces, and are collected by gravity flow or other means. However, mist eliminators have not been proposed for use an agricultural aircraft. If they are sufficiently fine to remove suspended dirt particles, they plug quickly, while if they are sufficiently coarse, they pass such dirt particles, and therefore do not fully clean the air.

In accordance with the invention, an inlet air cleaner system for turbine engines is provided, especially adapted for use in agricultural aircraft, and capable of removing virtually quantitatively from inlet air before it reaches the engine both dispersed particulate solid material and dispersed finely divided or aerosol-borne liquid material. The air cleaner assembly in accordance with the invention comprises, in combination, in flow sequence, disposed across the line of flow from the inlet to the engine, an array of vortex air cleaners, and an array of sheets of filamentary woven or nonwoven material.

A preferred embodiment of the vortex air cleaner mist eliminator assembly of the invention comprises, in combination, a housing having an inlet and an outlet arranged for flow therethrough of air carrying heavier and lighter contaminant particles and aerosol-borne particles; and, disposed in the housing across the line of air flow from the inlet to the outlet, in sequence, a first array removing heavier contaminant particles and comprising a plurality of vortex air cleaners, in which the vortex air cleaners comprise a straight tubular air cleaner body having a cylindrical central passage with an inlet and an outlet at opposite ends, and a deflector adjacent the inlet for creating a vortex stream in the influent air to concentrate heavier contaminant particles in the air at the periphery of the passage, and provide a core of air at the center of the passage containing lighter and aerosol-borne contaminant particles, and an outlet member having a central core air passage communicating with the cylindrical central passage of the tubular body and disposed within the passage at the outlet, the exterior wall of the outlet member defining a generally annular contaminant scavenge passage within the cylindrical central passage of the tubular body through which pass contaminant particles, while core air at the center of the passage passes through the central core air passage of the outlet member; and a second array removing lighter and aerosol-borne contaminant particles and comprising a plurality of superimposed knitted wire mesh sheets defining passages therethrough from face to face of the array, arranged in flow communication with the core air passages of the outlet members of the vortex air cleaners in the first array, the knitted wire mesh sheets comprising knitted wire filaments having a diameter within the range from about 0.0005 to about 0.035 inch, the sheets being compressed substantially throughout this surface area to a maximum pore diameter below about 5 mm, preferably below 2 mm, under a pressure within the range from about 1 to about 100 psi, such that the pressure drop across a 1.63 square foot portion of the array at a standard air flow of 2930 cfm at 25° C. is within the range from about 0.5 to about 3 inches water column, the wires at the interfaces of the juxtaposed interior layers being in pressure contact with each other substantially throughout by such compression.

In place of knitted wire mesh sheets, in whole or in part, there can be substituted woven wire mesh sheets and/or nonwoven wire filament sheets, formed of filaments within the same diameter range, and compressed under a pressure within the same pressure range.

The array of vortex air cleaners is known, and is described in Ser. No. 571,032, filed Apr. 23, 1975 now U.S. Pat. No. 4,050,913 patented Sept. 27, 1977 commonly assigned with the instant application, and the invention of one of the inventors herein, Charles J. Roach the disclosure of which is hereby incorporated by reference.

Vortex air cleaners have been provided to remove dirt and other contaminants from air entering such a gas turbine engine with low inlet restrictions. These air cleaners form a vortex or cyclone stream of the dirt-laden air passing through a tube, either by placing a deflector in the tube in the path of the influent air stream, or by introducing the air stream tangentially to the tube wall. Those dirt particles that are relatively heavy are thrown to the periphery of the vortex. The air at the center of the vortex is left relatively free of dirt particles, and carries only those particles too light to be thrown to the periphery, and dispersed particles of the nature of aerosols or mists. The core air is normally drawn off from the center of the tube, and the heavier dirt particles collected at the periphery of the tube.

The term "vortex air cleaner" as used herein thus refers to an air cleaner which comprises a straight tubular air cleaner body having a central passage with an inlet and an outlet at opposite ends; a deflector adjacent the inlet for creating a vortex stream in the influent air to concentrate any heavier contaminant particles in the air at the periphery of the passage, and any lighter particles in the air at the center of the passage; and an outlet member having a central air passage communicating with the central passage of the tubular body and disposed within the passage at the outlet, the exterior wall of the outlet member defining a generally annular contaminant scavenge passage within the central passage of the tubular body through which pass heavier contaminant particles while air at the center of the passage containing the lighter and stably dispersed particles passes through the central air passage of the outlet member.

Vortex air cleaners have the advantage that the inlet restriction and therefore the pressure drop between the inlet and outlet is quite low. Thus, they cause little power loss to the engine.

Furthermore, if a scavenge flow of air is employed to sweep contaminant particles from the assembly, higher cleaning efficiencies can be obtained, and the unit becomes self-cleaning.

Since small vortex air cleaners have a relatively low pressure drop, at moderate flows, and consequently cause little power loss to the engine, a large number of such vortex air cleaners are used in groups, in an array, to accommodate the large total flows required.

The term "vortex air cleaner array" as used herein refers to an assembly composed of a plurality of vortex air cleaners mounted together as a unit with their axes aligned in parallel, or a group of such assemblies. The vortex air cleaners are normally held between support plates which hold vortex air cleaners in position at their inlets or outlets. The scavenge passages of the vortex air cleaners empty into a common scavenge chamber, which is normally between the support plates. A scavenge port is provided in a wall of the scavenge chamber, for the removal of contaminant particles therefrom. The central air outlets of the air cleaners open into the space beyond the support plates, and such air thus runs straight through the air cleaners, at high velocity. It is considered important to have such air follow a straight-through course, to minimize pressure drop.

U.S. Pat. No. 3,520,114, patented July 14, 1970 to David B. Pall and Robert I. Gross, describes one type of vortex air cleaner array useful in aircraft, including flow-restricting means in the line of flow between the scavenge port of the array and the scavenge passage of the other vortex air cleaners, to restrict the scavenge flow therefrom, and to minimize the variation in scavenge flow among all air cleaners of the array, thereby providing substantially uniform scavenge flow for all vortex air cleaners of the array. U.S. Pat. No. 3,611,679, dated Oct. 12, 1971, provides vortex air cleaners particularly suited for use as one of an array of closely spaced air cleaners for efficiently removing contaminant particles from relatively high velocity air with a low pressure drop. The air cleaner has a tubular body, with an inlet at one end, an outlet at the opposite end, and a central passage therebetween, and a deflector coaxially mounted in the passage adjacent the inlet creating a vortex stream of influent air in the passage, with a generally coaxially tubular outlet member positioned within the outlet end of the tubular body, separating the contaminant particles at the periphery from relatively clean air at the core of the turbulent flow of air through the passage.

In one embodiment, the passage has an inside diameter of less than about one inch, and the vanes of the deflector extend along the central passage for a length within the range from about 50% to about 60% of the total length of the passage.

In another embodiment, the pitch length in inches of the vanes of the deflector and the inside diameter in inches of the central passage of the tubular body have a relationship that is expressed according to the equation $Pl = Kd^{.68}$, in which K is within the range from about 2.2 to about 3.2.

Figure 2:
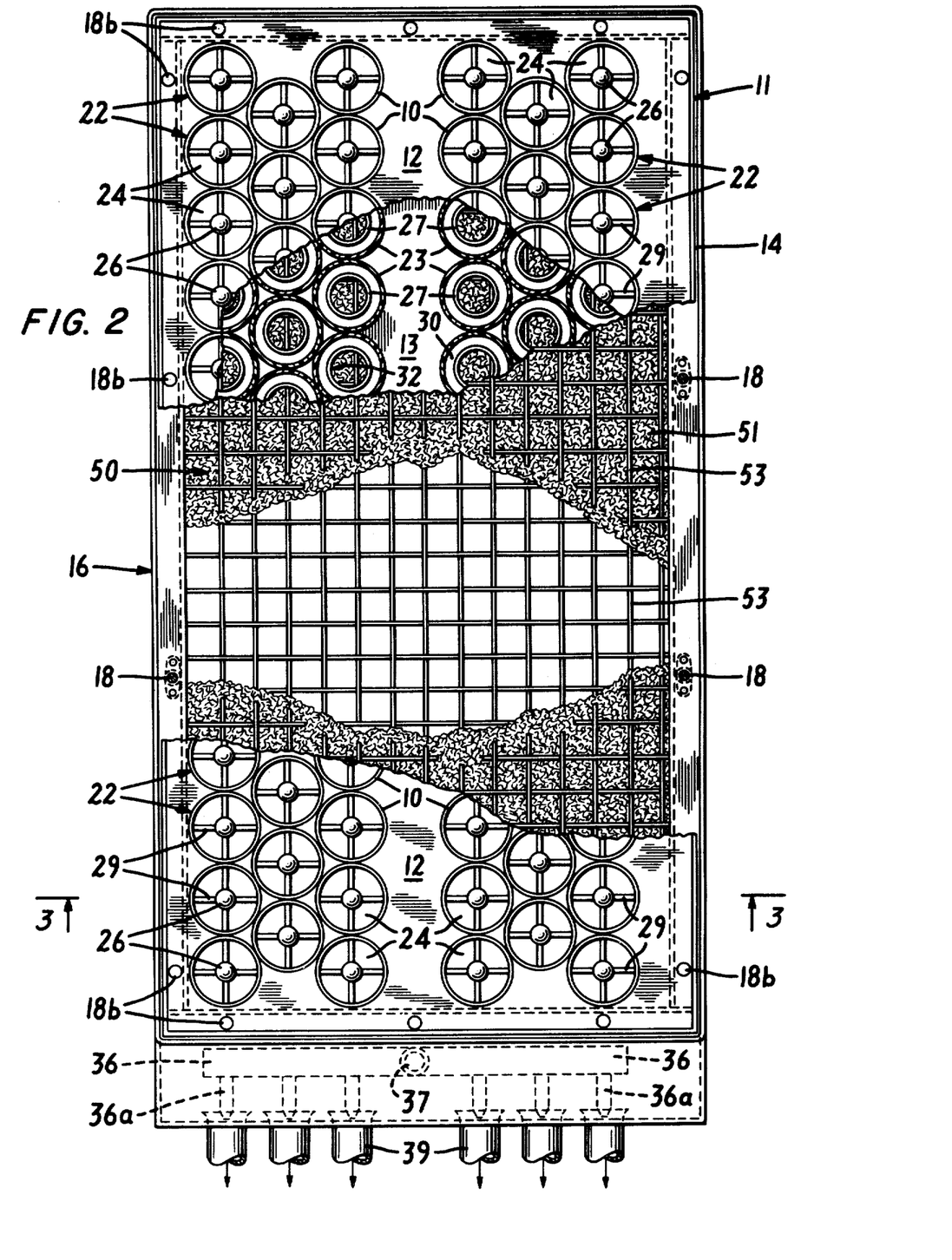
FIG. 2 is a plan view with parts cut away showing the gas inlet face of a vortex air cleaner array, taken along the line 2—2 of FIG. 1.

In a vortex air cleaner array, usually the individual air cleaners are spaced together as closely as possible. This means, as shown in FIG. 2, that the individual air cleaners are arranged in parallel rows, with the individual cleaners of each row being slightly and uniformly offset from the cleaners of the next row. In this way, the rows can be placed slightly closer together than the outside diameter of the adjacent individual air cleaners would otherwise allow.

The sheets of filamentary material have filaments or wires whose diameter is within the range from about 0.0005 to about 0.035 inch, and an open volume within the range from about 80 to about 99.9%, preferably from about 95 to about 99.9%, and are arranged in an array of a plurality of layers under a compression within the range from about 1 to about 100 psi, the array having a thickness or depth within the range from about 0.5 to about 10 inches.

A preferred embodiment of the inlet air cleaner assembly in accordance with the invention is shown in the drawings, in which.

Figure 1:
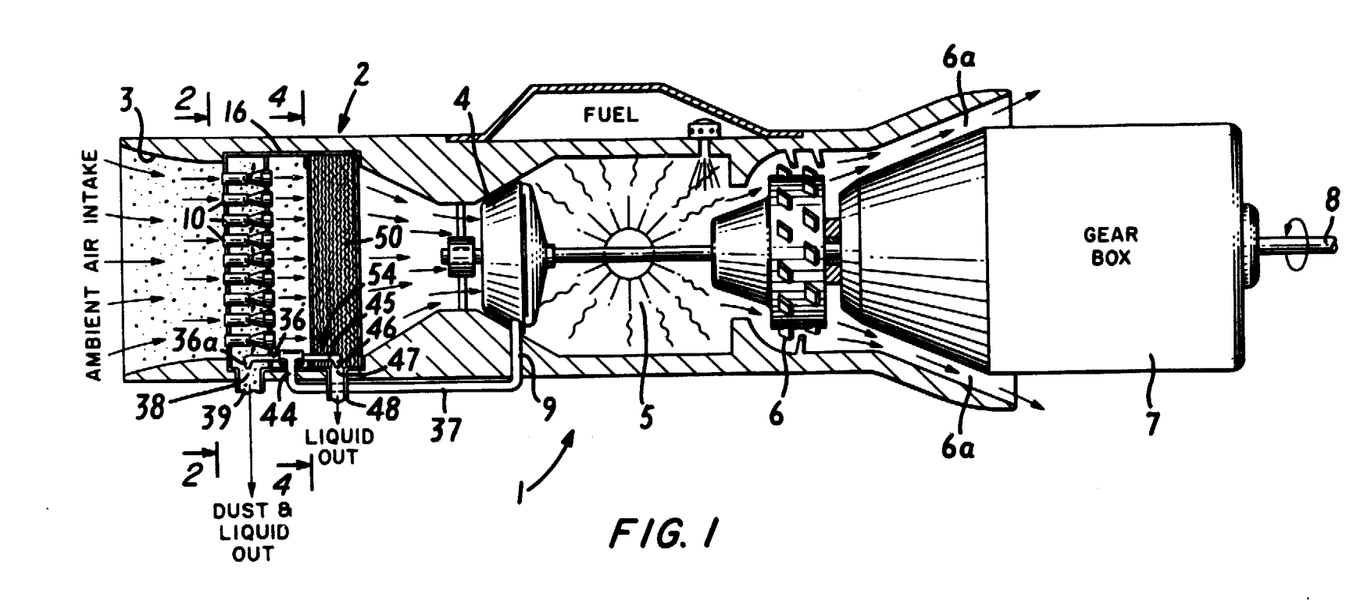
FIG. 1 represents a longitudinal section through a gas turbine engine, showing the location of the air cleaner assembly in accordance with the invention, at the engine air inlet, before the compressor.

The turbine engine 1 shown in FIG. 1 is of conventional construction for a turboprop aircraft, except for the air cleaner assembly 2 of the invention. The engine includes, in flow sequence, an air inlet or intake 3, a compressor 4, a burner 5, a turbine 6, and optionally a gear box 7 or other output drive shaft speed reducing means operating the optional output drive shaft 8. A pure jet aircraft would not include a gear box or other propulsion drive reducing means. An engine exhaust line 6a vents the products of combustion to atmosphere, after passing through the turbine 6. A bleed air outlet 9 on the compressor 4 supplies compressed air for the engine control, cockpit air control, and auxiliary power systems.

The air inlet 3 upstream of the compressor is of a sufficiently large size to channel the large volumes of air required by the engine. Disposed across the line of flow of air from the air inlet 3 to the compressor 4 is an air cleaner assembly 2 in accordance with the invention.

Figure 5:
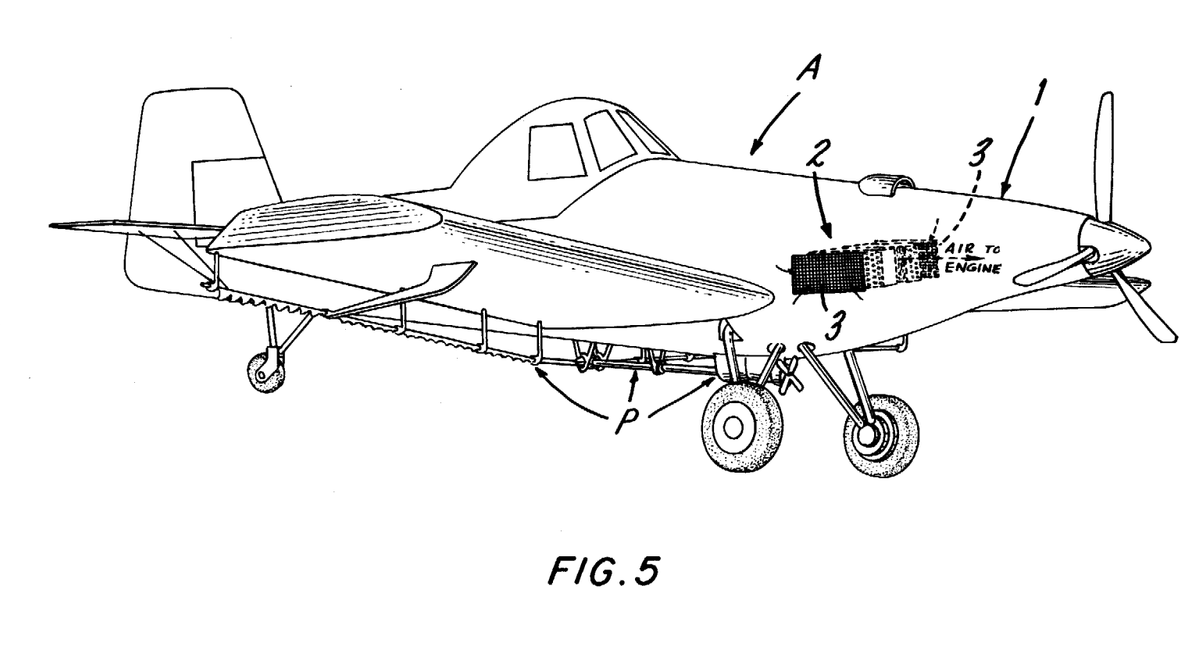
FIG. 5 is a side view of an agricultural aircraft equipped with the gas turbine engine and air cleaner assembly of the invention.

FIG. 5 shows the location of the gas turbine engine and air cleaner assembly of the invention on a conventional agricultural aircraft A, fitted with an applicator pipe system P for distribution of chemicals over the terrain below. On each side of the aircraft in series flow to the engine 1 are the engine air intakes 3 and the air cleaner assemblies 2 of the invention.

Figure 3:
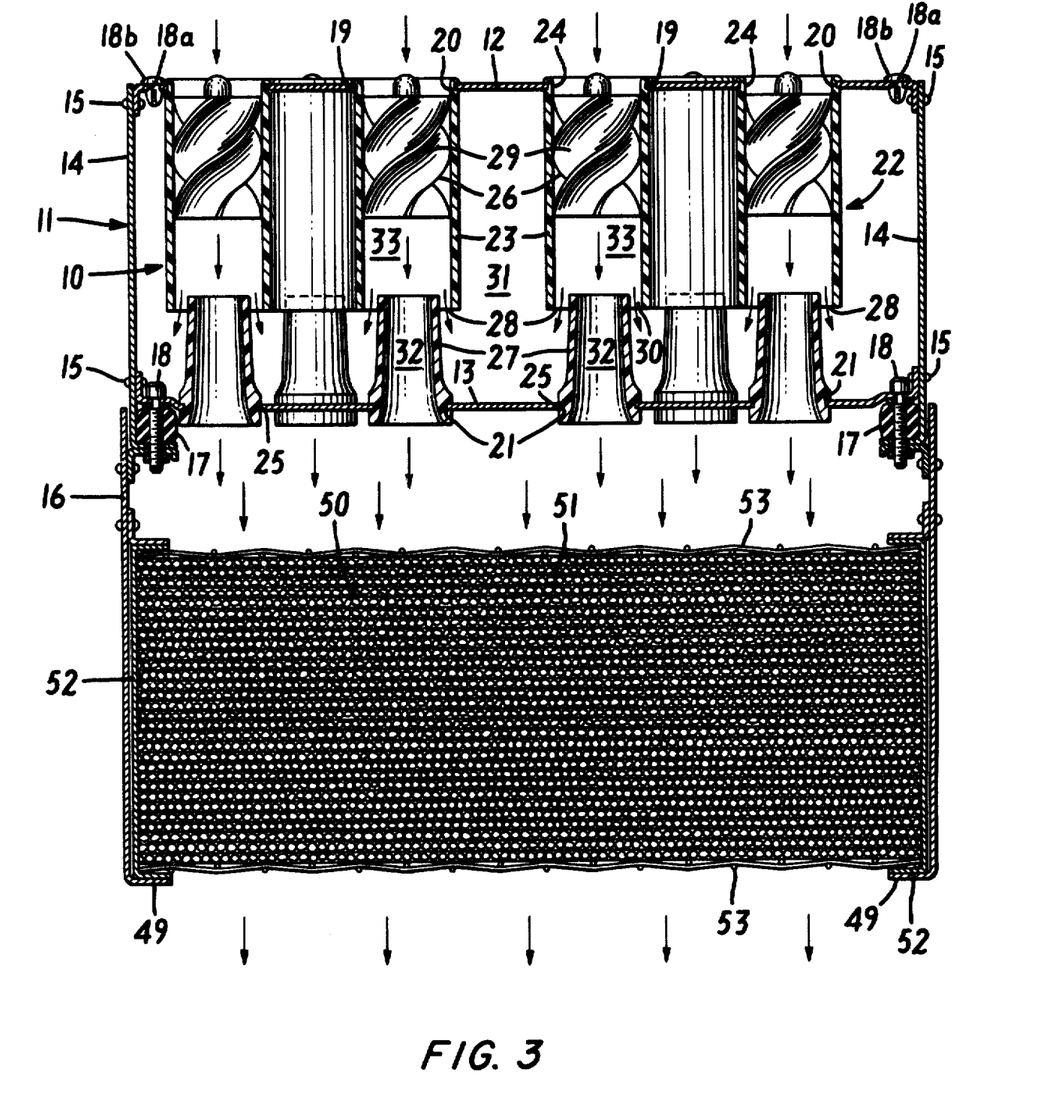
FIG. 3 is a longitudinal sectional view through the vortex air cleaner array of FIG. 2, showing individual air cleaners, and also showing the knitted wire mesh mist eliminator downstream of the vortex air cleaner array.
Figure 4:
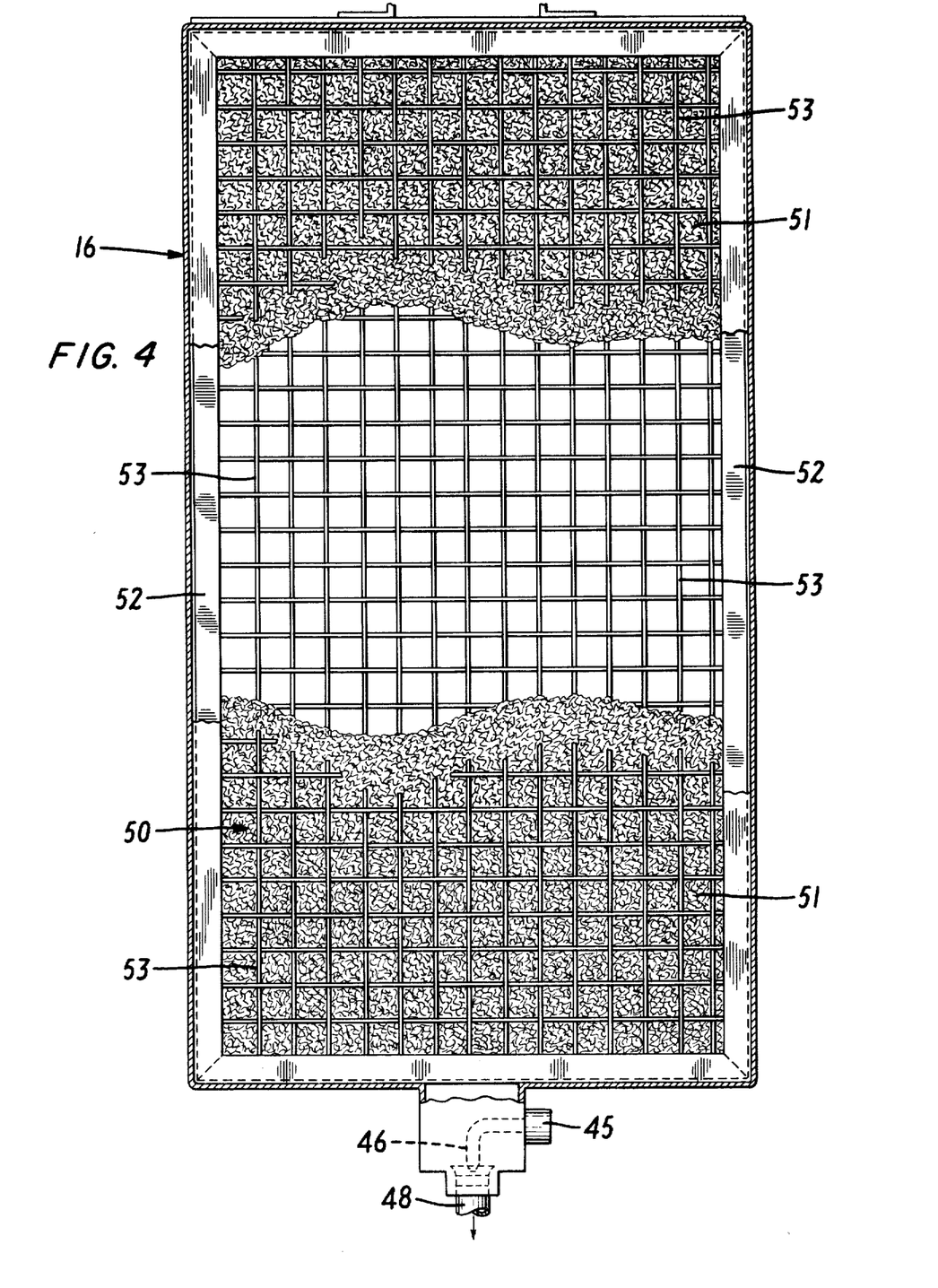
FIG. 4 is a plan view with parts cut away taken along the line 4—4 of FIG. 1, showing the gas inlet face of the knitted wire mesh array of FIG. 1.

The air cleaner assembly of the invention, as is best seen in FIGS. 2 to 4, comprises an array 10 of vortex air cleaners, and a mist eliminator 50.

The vortex air cleaner array 10 is of conventional construction, and comprises an array of vortex air cleaners 10 supported in an air cleaner assembly housing 11 that also includes the mist eliminator 50 and comprising a vortex generator plate 12 and an outlet tube plate 13 closing off the open end of an enclosing shell 14. The vortex generator and outlet plates 12 and 13 are turned 90° at their periphery, and are held to the shell 14 by rivets 15. The inner plate is shock-mounted to the air cleaner housing 16 through rubber air seals 17 and bolts 18, access to which is provided by apertures 18a and removable plugs 18b in plate 12.

The vortex generator and outlet tube plates 12, 13 are formed with a plurality of apertures 20 and 21. The apertures 20 accommodate and support the vortex generator tubes 22. Each vortex generator tube 22 comprises a tubular housing 23 having a central passage 33, an inlet 24 and an outlet 28. A vortex generator 26 is disposed within the central passage 33 adjacent the inlet 24. The housing 23 is made of metal or glass fiber-filled polypropylene.

The vortex generator 26 is made of glass fiber-filled polypropylene, and is bonded in position at the inlet by a resin adhesive. The vanes 29 are helical.

The apertures 21 accommodate and support the generally tapered tubular outlet tubes 27, disposed with one end extending into the outlet 28 of the passage 33. The outlet tubes have a tapered central open passage 32 therethrough for the removal of a central core of air of passage 33. The outlet tubes define an annular space 30 between the vortex generator housing 23 and the outer periphery of the outlet tube 27, for receiving the peripheral annulus of air in passage 33, for the removal of dirt particles.

The apertures 20 on the vortex generator plate 12 engage in a circumferential groove 19 about the inlet 24 of each vortex generator housing tube 23 of each separator 22. The apertures 21 in the outlet tube plate 13 each engage a circumferential groove 25 on each outlet tube 27. The space 31 between the support plates 12 and 13 (which defines the interior of the air cleaner housing 11) communicates with the annular passage 30 of each separator and constitutes a scavenge chamber. The duct 37 (see FIGS. 1 and 2) communicates the scavenge chamber 31 to the bleed air line 9a from the compressor 4 of the engine. The core air passes through the central passage 32 of the outlet tubes 27 without entering the contaminant scavenge chamber 31.

Under ideal conditions, the average pressure drop through each tube at 2250 s.c.f.m. is approximately eight inches water column from the inlet 24 of each vortex generator tube 22 to the core air outlet of the outlet tube 27.

The vortex air cleaner array removes large particles and also large liquid drops, as well as particles considerably heavier than air, regardless of size. This material is collected in the scavenge chamber 31, and is dumped. For this purpose, an ejector system is provided, using air under pressure from the bleed air line 9 of the compressor, which is tapped by line 37, feeding the air under pressure directly to the ejector tubes 36, whose nozzles 36a open into the ejector throats 38. Air at high speed ejected from the nozzles 36a in the throats 38 draws air and with it liquid and solid contaminants from the scavenge chamber 31, and dumps the material overboard at outlet ports 39. In this case, each half-side of the scavenge chamber 31 has as the ejector system an array of three ejector tubes in two groups, a total of six, but arrangement and number of ejector tubes can of course be used, according to the size of the chamber and the amount of air designed to be dumped overboard. A large number or size or both may be required if the engine air flow is higher.

The air stream from the vortex air cleaner array has most of the large and heavier contaminants removed, but finely divided solid particles too light in weight or too well dispersed in the air to be separated remain entrained, as well as liquid droplets so finely divided as to constitute stable aerosols or mists. Such material is virtually quantitatively removed in the mist eliminator 50.

The mist eliminator comprises an array of nine oil-coated knitted wire mesh sheets 51 having an open volume of 97.3% and confined under a compression of about 1 psi within a frame 52 between rigid grids 53 of stainless steel. In this case, the knitted wire mesh sheets are made of stainless steel wires, seven sheets of 0.006 inch diameter wires, and two of 0.011 inch diameter wires. The wires of the combined sheets in the array occupy only 2.7% of the volume of the mist eliminator, the remainder of the volume, 97.3%, is open. The thickness of the knitted wire mesh array is 2 inches.

Finely divided solid material of micron dimensions passing through the vortex air cleaner array tends to lodge in the convoluted interstices of the knitted mesh stack, and collects there. The oil (or other nonvolatile liquid) coating markedly increases the effectiveness of solids removal from the air stream, retaining the solids upon impingement thereon, but it can be omitted if desired. The liquid that is removed by impingement on the oil coating the wires of the mesh tends to flow by gravity downwardly, and collects at the bottom of the array, washing off and carrying along some of the solid material as it does so. For removal of this liquid and suspended solid material, an ejector 54 is provided in the bottom of the housing 52. This ejector is of a design similar to those of the vortex air cleaner array. The line 44 feeds air under pressure from bleed lines 9 to the ejector tube 45, terminating in a nozzle 46 in the ejector throat 47. The liquid and whatever solid material is suspended therein is drawn into the throat 47 and dumped overboard at outlet port 48. This ensures that the liquid material is removed, and the open volume of the array maintained, and it also takes advantage of the wash filter action of the liquid as it percolates down the mesh stack towards the ejector.

The mist eliminator may become overburdened by solids under certain conditions, and consequently provision is made to slide out the mist eliminator from the air cleaner assembly housing on guides 49, to facilitate cleaning and/or replacement whenever required. The mist eliminator array can be discarded when it is sufficiently laden with contaminant material that cannot be removed as to impose a serious pressure drop and/or air flow restriction on the inlet air to the engine, since this of course will cause loss of power and increase operating costs. Reverse flow cleaning with appropriate liquids is effective, and can be used. A cleaned mist eliminator is readily reinstalled simply by sliding it into the housing, in the manner shown.

The mist eliminator can be composed of an array of any sheet made of metal or plastic filamentary or wire material. Knitted wire mesh is a preferred material, but woven wire mesh and nonwoven wire mats can also be used.

A knitted mesh is composed of rows of loops, each caught into the previous row, and depending for its support on both the row above and the row below. There are two types of knitting, weft and warp. In weft-knit mesh the loops run crosswise of the fabric, and each loop is linked into the loop on the preceding row. In warp-knit mesh, parallel yarns are united in a chain stitch, first one yarn and then the other zigzagging to tie the yarns together; and the loops interlock with weftwise and warpwise in the fabric. Warp-knitted mesh has about four times as many stitches to the inch as weft-knit mesh, and is of a stronger and closer construction.

Knitted wire mesh stacks of the invention can be made up of warp-knitted or weft-knitted wire mesh in any combination of mesh, wires, pore sizes, and knit types and stitches, such as plain stitch or purl stitch, flat stitch or rib stitch, open work stitch or tuck stitch, weft-knit mesh; and single-bar tricot, double-bar tricot and Milanese warp-knit mesh. Flat knit and circular knit mesh can be used. Circular knit mesh can be cut open, or used double.

Woven wire mesh can be woven in any available open weave, such as plain weave, square weave, twill weave, and Dutch twill weave.

Nonwoven wire mats are made of intertwined and intermingled continuous or long filament material.

It is important that the filamentary sheet be non-bonded, i.e., the filaments should not be bonded together at their points of crossing.

When sheets of filamentary material are superimposed at random in an array of layers, the pores of adjacent layers do not necessarily line up, because the sheets have an uneven surface, with projecting portions resulting in relative displacement and spacing of adjacent layers. Upon compression of the composite in a direction perpendicular to the plane of the layers, this displacement may be increased. Thus, because of the random orientation of the layers of the stack, the through pores follow an extremely tortuous path.

This compression and relative displacement has the effect of reducing the size of the through pores in the stack. Filaments of adjacent layers may project into and partially obstruct the surface openings of pores of the next adjacent layers, and upon compression this effect can be repeated many times.

The sheets of filamentary material of the invention can be formed of filaments or wires of any metal. For most uses, metals which are inert to and noncorroded by the fluid being filtered or the gas in contact therewith are of course preferred. Stainless steel is a very suitable material. Aluminum, brass and bronze wires can also be used. Other metals that are useful include copper, iron, steel, molybdenum, tantalum, colombium, titanium, tungsten, nickel-chromium alloys, cobalt-based alloys, chromium-plated wires of all types, zinc-plated wires of all types, and cadmium-plates wires of all types. Corrosion resistant alloys such as Monel metal and plastic mono-filaments can also be used, especially for salt water environments. Inert plastics such as polypropylene, polyethylene, polyamides, polyesters and polyisobutylene, are preferred. Where corrosion resistance is not important, however, other plastics can be used, such as polyvinyl chloride, polyvinylidene chloride and polyacrylonitrile.

The wires or filaments are usually monofilaments. The wires or filaments can be of any cross-sectional configuration, such as round, square, flat, polygonal, elliptical and rectangular. Stranded multifilament wire can be used.

The stack of the invention is prepared by superimposing a selected number of sheets of filamentary material, one above the other. The orientation is random, preferably, since this best enables one sheet to remedy any nonuniformity in the next sheet, and produce a composite that is uniform throughout, but an orderly or a patterned orientation, such as laying alternate sheets at right angles, or other specific orientation, to the one below may have advantages in some instances.

It is important that the stack of knitted wire mesh layers have as much open area as possible, so as to avoid imposing restrictions on air flow. Consequently, it is preferred that the open volume be within the range from about 95 to about 99.9%, although under certain circumstances open areas ranging to as low as about 80% can be tolerated.

Liquids are removed by impingement on the wires or filaments of the array. Consequently, it is desirable to have as many wires or filaments as possible within the volume of the array, while at the same time retaining the desired open volume. This means that the finer wires or filaments having diameters ranging from about 0.003 to about 0.015 inch are preferred. The wires can in general range in diameter from about 0.0005 inch to about 0.035 inch.

The layers in the array can be flat or corrugated. Combinations of flat and corrugated layers of the same or different sheet or mesh types are frequently quite advantageous. The random disposition of the openings in the sheets in a plurality of juxtaposed layers of different types tends to average out over the entire array, through the volume of the array, producing relatively uniform porosity throughout. The uniformity is increased if layers of different wire sizes and different proportions of openness are employed, in combination.

A particularly preferred combination of knitted wire mesh layers is composed of the following:

| Sequence and Number of Layers | Knitted Wire Mesh Layer Characteristics |
|---|---|
| One | 2 × 2 × 0.011 inch flat |
| Seven | 2 × 2 × 0.006 inch corrugated |
| one | 2 × 2 × 0.011 inch flat |

The more layers in a stack, the greater the pressure drop across the stack, but at the same time the ability to remove suspended contaminants increases, up to an optimum, after which the greater pressure drop across the stack is not compensated for by an increased removal efficiency. Accordingly, the thickness of the stack will in general be within the range from about 0.5 to about 10 inches, and preferably from about 1.5 to about 3 inches.

The flexibility of the stack, even at the maximum thickness indicated, is remarkable, and consequently the stack can be put in any desired shape, according to the space restrictions of the aircraft. It is usually preferable that the stack be flat, and the opposite faces parallel, but there is no reason why a stack cannot be used that is thicker on one side than on another, and that is curved in a convex or concave configuration, or with double convex or double concave faces, and any combination of dimpled, waffled or corrugated patterns. It can in fact be bent or curved to fit any desired contour of inlet passage, downstream of the vortex air cleaner array. Since however the vortex air cleaner array is not so flexible, and is normally arranged with the vortex air cleaners of the array in parallel, and as close together as possible, a closely juxtaposed mist eliminator will also have the same flat surface configuration at least at the side facing the outlet side of the vortex air cleaner array.

A gauge of the number of wires per unit volume of sheet is given by the density, which is also an indication of the size of openings in the wire sheet. The sheets in accordance with the invention can have a density within the range from about 0.25 to about 5 lbs/ft 3, and preferably from about 0.5 to about 3 lbs/ft 3.

For improved wire distribution and low pressure drop, corrugated sheets are preferable. These should be crossed in the stack, so that the crimps are not nested, thereby spacing the layers from each other, and increasing the proportion of open area.

The mist eliminator is assembled by stacking the number of layers desired, with or without corrugating, and then enclosing the stack between facing grids, which are rigid and retain the layers under compression, or binding the wire mesh layers together, such as for example by wire stitching at spaced intervals throughout the surface area. The degree of compression will depend upon the openness desired, since of course compression reduces open area by pushing the layers closer together, and to some extent pressing out corrugations. However, compression increases rigidity, and also increases uniformity. In general, the stack should be retained under a compression within the range from about 1 to about 100 psi, and preferably from about 1.5 to about 5 psi.

The inlet air cleaner assembly of the invention can be used in series with the air intake in any kind of gas turbine engine for aircraft, such as turboprop and pure jet engines, in any kind of agricultural aircraft where dirt and other contaminant ingestion is a problem. Monoplanes and biplanes, fixed wing and rotary wing aircraft powered by turboprop and jet engines are benefited by incorporation of such assemblies to clean air entering the engine.

Having regard to the foregoing disclosure, the following is claimed as the inventive and patentable embodiments thereof:

1. A vortex air cleaner mist eliminator assembly comprising, in combination, a housing having an inlet and an outlet arranged for flow therethrough of air carrying heavier and lighter contaminant particles and aerosol-borne particles; and disposed in the housing across the line of air flow from the inlet to the outlet, in sequence, a first array removing heavier contaminant particles and comprising a plurality of vortex air cleaners having a straight tubular air cleaner body with a cylindrical central passage therethrough and an inlet and an outlet at opposite ends, and a deflector adjacent the inlet for creating a vortex stream in the influent air to concentrate contaminant particles in the air at the periphery of the passage, and provide a core of air at the center of the passage containing lighter and aerosol-borne contaminant particles, and an outlet member having a central core air passage communicating with the cylindrical central passage of the tubular body and disposed within the passage at the outlet, the exterior wall of the outlet member defining a generally annular contaminant scavenge passage within the cylindrical central passage of the tubular body through which pass contaminant particles, while core air at the center of the passage passes through the central core air passage of the outlet member; and a second array removing finely divided solid contaminant particles too light in weight or too well dispersed in air to be separated, and liquid droplets so finely divided as to constitute stable aerosols and mists and comprising a plurality of superimposed sheets of filamentary material defining passages therethrough from face to face of the array, arranged in flow communication with the core air passages of the outlet members of the vortex air cleaners in the first array, the array having a depth within the range from about 0.5 to about 10 inches, the sheets comprising monofilaments having a diameter within the range from about 0.005 to about 0.035 inch, and being compressed substantially throughout this surface area to a maximum pore diameter below about 5 mm under a pressure within the range from about 1 to about 100 psi, such that the pressure drop across a 1.63 ft$^2$ portion of the array at a standard air flow of 2930 cfm at 25° C. is within the range from about 0.5 to about 3 inches water column, the filaments at the interface of the interior layers being in pressure contact with each other substantially throughout by such compression.

2. A vortex air cleaner mist eliminator assembly in accordance with claim 1, in which the vortex air cleaner array comprises a plurality of air cleaners arranged in parallel rows, with the individual cleaners of each row being slightly and uniformly offset from the cleaners of the next row, with the rows placed closer together than the diameter of the individual vortex air cleaners of the rows.

3. A vortex air cleaner mist eliminator assembly in accordance with claim 1, in which the vortex air cleaner array comprises a plurality of vortex air cleaners mounted together as a unit with their axes aligned in parallel.

4. A vortex air cleaner mist eliminator assembly in accordance with claim 3, in which the vortex air cleaners are held between support plates at their inlets and outlets, and have scavenge passages which empty into a scavenge chamber between the support plates; and a scavenge port in a wall of the scavenge chamber, for the removal of contaminant particles therefrom; and the vortex air cleaners have core air outlets opening into the space beyond the support plates.

5. A vortex air cleaner mist eliminator assembly in accordance with claim 4, in which the scavenge port comprises a venturi passage drawing contaminant particles and air from the scavenge chamber and venting them via the scavenge port.

6. A vortex air cleaner mist eliminator assembly in accordance with claim 1, in which the filaments have a diameter within the range from about 0.003 to about 0.015 inch.

7. A vortex air cleaner mist eliminator assembly in accordance with claim 1, wherein the sheets are of knitted wire mesh.

8. A vortex air cleaner mist eliminator assembly in accordance with claim 1, wherein the sheets are of woven wire mesh.

9. A vortex air cleaner mist eliminator assembly in accordance with claim 1, wherein the sheets are of nonwoven wire mesh.

10. A vortex air cleaner mist eliminator assembly in accordance with claim 1, wherein the sheets are made of stainless steel wire.

11. A vortex air cleaner mist eliminator assembly in accordance with claim 1, in which there are at least nine of said sheets in juxtaposed face-to-face contact.

12. A vortex air cleaner mist eliminator assembly in accordance with claim 1, in which the superimposed sheets are confined between rigid foraminous supports at the upstream and downstream faces thereof.

13. A vortex air cleaner mist eliminator assembly in accordance with claim 1, in which the sheets are of monofilaments of the same diameters.

14. A vortex air cleaner mist eliminator assembly in accordance with claim 1, in which the sheets are of monofilaments of different diameters.

15. A vortex air cleaner mist eliminator assembly in accordance with claim 1, in which the superimposed sheets comprise corrugated sheets interleaved crosswise so the corrugations do not nest.

16. A vortex air cleaner mist eliminator assembly in accordance with claim 1, in which the superimposed sheets comprise corrugated sheets and noncorrugated sheets.

17. A gas turbine engine comprising a housing; a gas turbine in the housing; an air intake in the housing for air fed to the gas turbine; and a vortex air cleaner mist eliminator assembly in accordance with claim 1, in series gas flow connection between the air intake and the gas turbine.

18. A gas turbine engine according to claim 17, comprising a gear assembly operatively connected to the gas turbine.

19. An agricultural aircraft comprising an aircraft having means for application of chemicals to the ground below the aircraft and powered by a gas turbine engine in accordance with claim 18.

20. A gas turbine engine according to claim 17 comprising a compressor, an air ejector in the vortex air cleaner array, and a bleed air line connecting the compressor to the ejector of the vortex air cleaner array for scavenge flow of compressed air through the ejector.

21. An agricultural aircraft comprising an aircraft having means for application of chemicals to the ground below the aircraft and powered by a gas turbine engine in accordance with claim 20.

22. A gas turbine engine according to claim 17 comprising a compressor, an air ejector in the mist eliminator and a bleed air line connecting the compressor to the ejector of the mist eliminator for scavenge flow of compressed air through the ejector.

23. An agricultural aircraft comprising an aircraft having means for application of chemicals to the ground below the aircraft and powered by a gas turbine engine in accordance with claim 20.

24. An agricultural aircraft comprising an aircraft having means for application of chemicals to the ground below the aircraft and powered by a gas turbine engine in accordance with claim 17.

25. An inlet air cleaner assembly for the air intake of gas turbine engines comprising, in combination, a housing having a gas inlet and a fluid flow connection from the gas inlet to the air intake; a gas outlet and a fluid flow connection from the gas outlet to the gas turbine engine; the inlet and outlet and fluid connections therewith being arranged for flow therethrough of air carrying heavier and lighter contaminant particles and aerosol-borne particles; and, disposed across the line of gas flow from the gas inlet to the gas outlet, a first array of vortex air cleaners removing coarse and heavy contaminant particles, but not light and well-dispersed contaminant particles, and comprising a plurality of vortex cleaners having a straight tubular air cleaner body with a cylindrical central passage therethrough and an inlet and an outlet at opposite ends, and a deflector adjacent the inlet for creating a vortex stream in the influent air to concentrate contaminant particles in the air at the periphery of the passage, and provide a core of air at the center of the passage containing lighter and aerosol-borne contaminant particles, and an outlet member having a central core air passage communicating with the cylindrical central passage of the tubular body and disposed within the passage at the outlet, the exterior wall of the outlet member defining a generally annular contaminant scavenge passage with the cylindrical central passage of the tubular body through which pass contaminant particles, while core air at the center of the passage passes through the central core air passage of the outlet member; and a second array of sheets of filamentary woven or nonwoven material, arranged to receive partially cleaned air from the vortex air cleaner array, and remove finely divided solid contaminant particles too light in weight or too well dispersed in air to be separated, and liquid droplets so finely divided as to constitute stable aerosols and mists, and comprising a plurality of superimposed sheets of filamentary material defining passages therethrough from face to face of the array, arranged in flow communication with the core air passages of the outlet members of the vortex air cleaners in the first array, the array having a depth within the range from about 0.5 to about 10 inches, the sheets comprising monofilaments having a diameter within the range from about 0.005 to about 0.035 inch, and being compressed substantially throughout this surface area to a maximum pore diameter below about 5 mm under a pressure within the range from about 1 to about 100 psi, such that the pressure drop across a 1.63 ft$^2$ portion of the array at a standard air flow of 2930 cfm at 25° C. is within the range from about 0.5 to about 3 inches water column, the filaments at the interface of the interior layers being in pressure contact with each other substantially throughout by such compression.

* * * * *